(12) United States Patent
Kuwabara

(10) Patent No.: US 10,843,559 B2
(45) Date of Patent: Nov. 24, 2020

(54) POWER TRANSMISSION DEVICE FOR FOUR WHEEL DRIVE VEHICLE

(71) Applicant: Nissan Motor Co., Ltd., Yokohama (JP)

(72) Inventor: Takahiro Kuwabara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/651,390

(22) PCT Filed: Oct. 24, 2017

(86) PCT No.: PCT/JP2017/038273
§ 371 (c)(1),
(2) Date: Mar. 27, 2020

(87) PCT Pub. No.: WO2019/082257
PCT Pub. Date: May 2, 2019

(65) Prior Publication Data
US 2020/0298700 A1    Sep. 24, 2020

(51) Int. Cl.
*B60K 17/344* (2006.01)
*B60K 6/24* (2007.10)
(Continued)

(52) U.S. Cl.
CPC ............ *B60K 17/344* (2013.01); *B60K 17/24* (2013.01); *B60K 6/24* (2013.01); *B60K 6/26* (2013.01);
(Continued)

(58) Field of Classification Search
CPC .. B60K 17/344–3467; B60K 6/20–547; B60K 23/08–2023/0891
See application file for complete search history.

(56) References Cited

U.S. PATENT DOCUMENTS 5,450,921 A * 9/1995 Kameda ............... B60K 5/04
                                              180/297
6,041,877 A * 3/2000 Yamada ............... B60W 10/10
                                              180/65.25
(Continued)

FOREIGN PATENT DOCUMENTS

| EP | 1 216 875 A2 | 6/2002 |
| GB | 2 378 930 A  | 2/2003 |

(Continued)

*Primary Examiner* — David R Morris
(74) *Attorney, Agent, or Firm* — Global IP Counselors, LLP

(57) ABSTRACT

In a power transmission device of a four-wheel drive electrically driven vehicle, the power source includes a transverse engine supported on one side surface of a gear case, and a motor supported on the other side surface. A transfer case is supported on the same side surface of the gear case as the motor. The transfer case has a transfer input shaft arranged in the vehicle width direction, a transfer output shaft arranged in the longitudinal direction of the vehicle, a bevel gear pair and a transfer gear pair. The bevel gear pair and the transfer gear pair transmit power by changing a rotational axis direction to an essentially orthogonal direction between the transfer input shaft and the transfer output shaft. An output shaft gear provided on the transfer output shaft of the transfer case is disposed in a position overlapping the gear case in a vehicle width direction.

14 Claims, 9 Drawing Sheets

(51) Int. Cl.
  *B60K 17/24* (2006.01)
  *B60K 6/26* (2007.10)
  *B60K 6/36* (2007.10)
  *F16H 1/20* (2006.01)

(52) U.S. Cl.
  CPC ............ *B60K 6/36* (2013.01); *B60Y 2200/92* (2013.01); *F16H 1/203* (2013.01)

(56) References Cited

U.S. PATENT DOCUMENTS

| | | | |
|---|---|---|---|
| 6,076,623 A | 6/2000 | Teraoka et al. | |
| 6,231,470 B1 * | 5/2001 | Cook | B60K 17/35 180/249 |
| 2005/0107200 A1 * | 5/2005 | Yamazaki | B60K 23/0808 475/84 |
| 2020/0298699 A1 * | 9/2020 | Kuwabara | B60K 23/0808 |

FOREIGN PATENT DOCUMENTS

| | | |
|---|---|---|
| JP | 2000-190751 A | 7/2000 |
| JP | 2000-335263 A | 12/2000 |
| JP | 2004-357375 A | 12/2004 |
| JP | 2008-110748 A | 5/2008 |
| JP | 2010-89556 A | 4/2010 |
| JP | 2012-187954 A | 10/2012 |
| JP | 2013-96511 A | 5/2013 |
| JP | 2013-99993 A | 5/2013 |

* cited by examiner

POWER TRANSMISSION DEVICE FOR FOUR WHEEL DRIVE VEHICLE

CROSS-REFERENCE TO RELATED APPLICATIONS

This application is a U.S. national stage application of International Application No. PCT/JP2017/038273, filed on Oct. 24, 2017.

BACKGROUND

Technical Field

The present disclosure relates to a power transmission device of a four-wheel drive vehicle comprising a transfer that is supported by a gear case and that distributes power from a power source to main drive wheels and auxiliary drive wheels.

Background Information

A power transmission structure of a four-wheel drive vehicle equipped with a transfer case (the power distribution mechanism 1) that is mechanically connected to one power source (the engine 13) via a transmission (the transmission 7) is known from the prior art (for example, refer to Japanese Laid-Open Patent Application No. 2008-110748).

SUMMARY

In the conventional device described above, the transfer case (the power distribution mechanism 1) is located on the same one of the two side surfaces of the transmission housing on which the power source (the engine 13) is supported. As a result of this layout arrangement, the transfer output shaft of the transfer case (the power distribution mechanism 1) is located essentially at the center in the vehicle width direction, and the propeller shaft can be disposed in the floor tunnel.

However, in recent years, as an increasing number of vehicles are being electrified, it is conceivable to add an electric motor as a power source. If a layout in which the electric motor is disposed on the "opposite side" of the engine with respect to the transmission housing is selected, the center location of the engine, the transmission housing, and the electric motor in the vehicle width direction moves from the center location that was established before the electric motor was added. Therefore, if the transfer case is arranged in the same manner as in the conventional device, the location of the transfer output shaft shifts from the center in the vehicle width direction, which creates the problem that the propeller shaft cannot be disposed in the floor tunnel.

In view of the problem described above, the object of the present disclosure is to make it possible to locate the transfer output shaft at essentially the center in the vehicle width direction and to avoid the inability to locate the propeller shaft in the floor tunnel.

In order to achieve the object described above, the present disclosure is provided with a transfer case that is supported by a gear case and that distributes power from a power source to main drive wheels and auxiliary drive wheels. In this power transmission device of a four-wheel drive vehicle, the power source includes an engine, which is supported on one of the two side surfaces of the gear case, and an electric motor, which is supported on the other side surface and which is smaller than the engine. The transfer case is supported on the same side surface of the two side surfaces of the gear case on which the electric motor is supported. The transfer case has a transfer input shaft that is connected via a differential to the main drive wheels and that is arranged in a vehicle width direction, a transfer output shaft that is connected the auxiliary drive wheels by a propeller shaft and that is arranged in the longitudinal direction of the vehicle, and a power transmission mechanism that transmits power by changing a direction of the axis of rotation to an essentially orthogonal direction between the transfer input shaft and the transfer output shaft. A rotatable member of the power transmission mechanism is provided on the transfer output shaft and is disposed in a position that overlaps the gear case in the vehicle width direction. The transfer case is supported by the gear case and wraps around from the side surface on which the electric motor is supported to a rear surface as seen from above in a layout configuration of a front-side power transmission system to provide a space that is surrounded by a vehicle-rear end surface of the engine, a dash panel, and a vehicle body side panel.

Thus, the overlapping of the gear case and the rotatable member of the transfer output shaft in the vehicle width direction make it possible to position the transfer output shaft at essentially the center position in the vehicle width direction, and to avoid the inability of locating the propeller shaft in the floor tunnel. When steering system components are installed, a layout configuration of a front-side power transmission system, in which a space that is not spatially restricted by the transfer case can be provided as the installation space for the steering system components, can be employed.

DETAILED DESCRIPTION OF THE EMBODIMENTS

Figure 1:
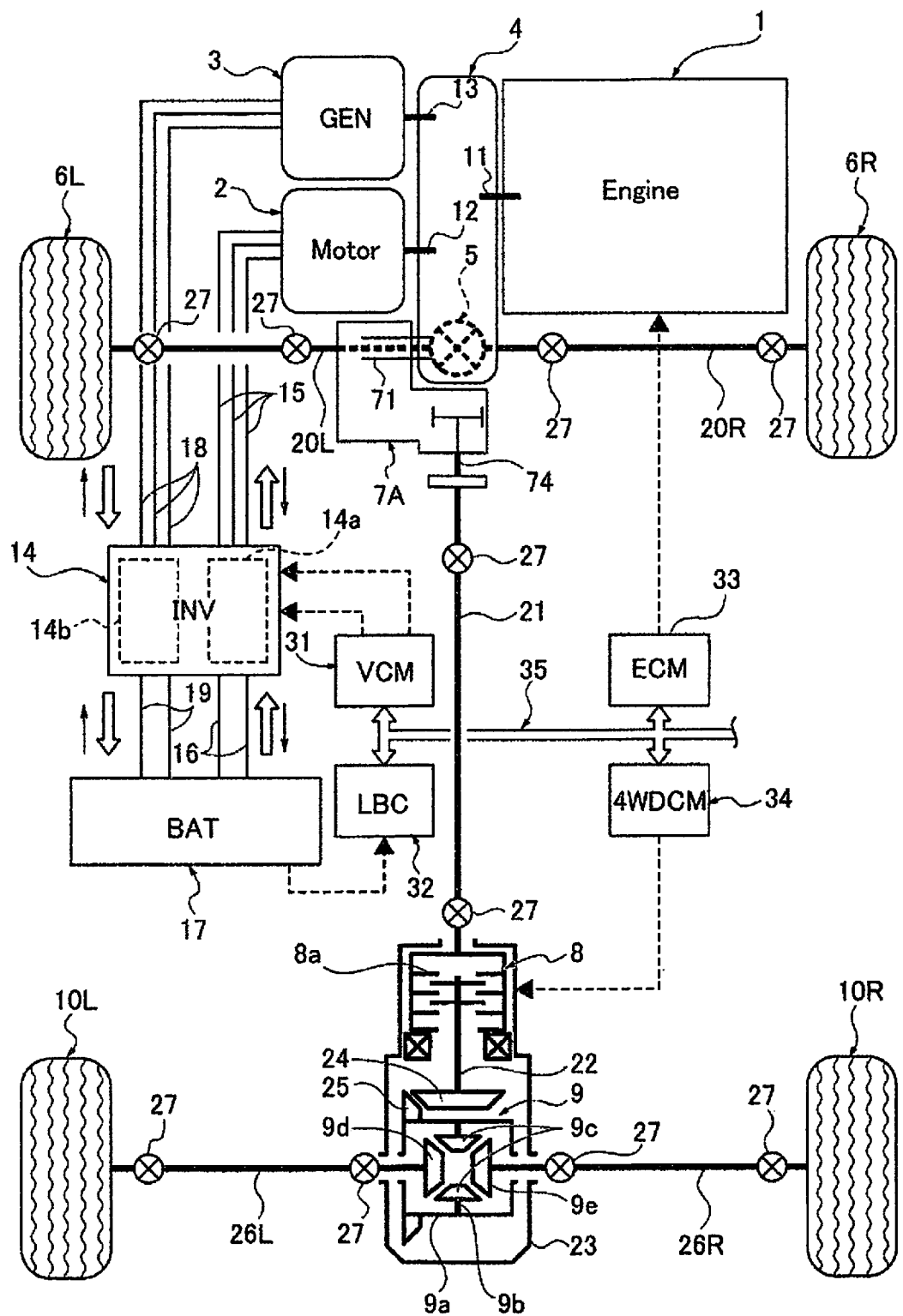
FIG. 1 is an overall system view that shows an FF-based four-wheel drive electrically driven vehicle (one example of a four-wheel drive vehicle) to which is applied the power transmission device according to a first embodiment.

A preferred embodiment for realizing a power transmission device of a four-wheel drive vehicle according to the present disclosure will be described below based on first to fourth embodiments shown in the drawings.

First Embodiment

The configuration is described first. The power transmission device according to the first embodiment is applied to an FF-based four-wheel drive electrically driven vehicle (one example of a four-wheel drive vehicle) that has an engine as a power source for power generation and a motor as a power source for travel, and that uses the electrical power generated by the engine to drive the motor. The "overall system configuration," the "layout configuration of the front-side power transmission system," the "detailed configuration of the gear case," and the "detailed configuration of the transfer case" will be separately described below with respect to the configuration of the first embodiment.

Overall System Configuration

FIG. 1 shows an FF-based four-wheel drive electrically driven vehicle to which the power transmission device according to the first embodiment is applied. The overall system configuration of the four-wheel drive electrically driven vehicle will be described below with reference to FIG. 1.

As shown in FIG. 1, a front-wheel drive system of a four-wheel drive electrically driven vehicle is provided with a transverse engine 1 (a first power source), a motor 2 (a second power source), a generator 3, a gear case 4, a front differential 5, and left and right front wheels 6L, 6R (main drive wheels). As shown in FIG. 1, a rear-wheel drive system is provided with a transfer case 7A, an electronically controlled coupling 8, a rear differential 9, and left and right rear wheels 10L, 10R (auxiliary drive wheels).

The transverse engine 1 is supported by the gear case 4 and is horizontally disposed so that engine crankshaft 11 is oriented in the vehicle width direction. The transverse engine 1 is mounted as a power source for power generation that drives the generator 3.

The motor 2 is supported by the gear case 4 and is horizontally disposed so that motor shaft 12 is oriented in the vehicle width direction. The motor 2 is a three-phase AC, permanent magnet-type synchronous motor that primarily functions as a power source for travel.

A motor inverter 14a of an inverter unit 14 is connected to the stator coil of the motor 2 by means of an AC harness 15. A lithium-ion battery 17 is connected to the motor inverter 14a by means of a DC harness 16. At the time power is supplied by the motor 2, the motor inverter 14a converts DC electrical energy from the lithium-ion battery 17 into three-phase AC electrical energy and generates driving torque for starting travel, constant-speed travel, and accelerating travel (a power source for travel function). At the time of regeneration by the motor 2, the motor inverter 14a converts the three-phase AC electric energy generated in the motor 2 into DC for storage in the lithium-ion battery 17, recharging the lithium-ion battery 17 while resistive loading from the negative regenerative torque is applied to reduce the speed (a deceleration power generation function.

The generator 3 is supported by the gear case 4 and is arranged horizontally such that generator shaft 13 is oriented in the vehicle width direction. The generator 3 is a three-phase AC, permanent magnet type synchronous motor that primarily functions as a power generation source.

A generator inverter 14b of the inverter unit 14 is connected to the stator coil of the generator 3 by means of an AC harness 18. A lithium-ion battery 17 is connected to the generator inverter 14b by means of a DC harness 19. At the time of generator regeneration by operation of the transverse engine 1, the generator inverter 14b converts the three-phase AC electrical energy generated by the generator 3 into DC electrical energy and charges the lithium-ion battery 17 (a power generation function). When the generator 3 is in operation, the generator inverter 14b converts the DC electrical energy from the lithium-ion battery 17 into three-phase AC electrical energy and driving torque is output for starting the transverse engine 1 (an engine starting function).

Here, the inverter unit 14 is disposed in an empty space region above the motor 2 and the generator 3. With regard to a floor panel of a passenger space, the lithium-ion battery 17 is disposed at a rear surface position of the floor panel in the seat area where the passenger seat is installed.

The gear case 4 has the front differential 5. The front differential 5 has a left-side gear 5d to which a left front drive shaft 20L extending to a left front wheel 6L is connected, and a right-side gear 5e to which a right front drive shaft 20R extending to a right front wheel 6R is connected (refer to FIG. 3).

The transfer case 7A is supported on the same side surface of the gear case 4 on which the motor 2 and the generator 3 are supported. A transfer input shaft 71 of the transfer case 7A is connected to a differential case 5a of the front differential 5 (refer to FIG. 3). A first rear propeller shaft 21, disposed essentially at the center in the vehicle width direction, is connected to a transfer output shaft 74 of the transfer case 7A and extends toward the rear of the vehicle.

The electronically controlled coupling 8 is located between a first rear propeller shaft 21 and a second rear propeller shaft 22 and next to the rear differential 9. The electronically controlled coupling 8 has a built-in multi-plate friction clutch 8a and transmits power from the motor 2 to a left rear wheel 10L and a right rear wheel 10R with the electronically controlled clutch engagement torque as the maximum transmission torque. The electronically controlled coupling 8 and the rear differential 9 are incorporated in a common housing 23.

The rear differential 9 includes a differential case 9a, a pinion shaft 9b, a pinion gear 9c, a left-side gear 9d, and a right-side gear 9e. A ring gear 25 that meshes with an input gear 24, provided at an end portion of the second rear propeller shaft 22, is fixed to the differential case 9a. The pinion gear 9c is rotatably supported by the pinion shaft 9b, which is supported by the differential case 9a. The left-side gear 9d and the right-side gear 9e mesh with the pinion gear 9c from the left and right sides, respectively. A left rear drive shaft 26L is connected to the left-side gear 9d, and a right rear drive shaft 26R is connected to the right-side gear 9e. Reference numeral 27 in FIG. 1 indicates a joint provided on each shaft 20L, 20R, 21, 26L, and 26R.

As shown in FIG. 1, the electronic control system of the four-wheel drive electrically driven vehicle comprises a vehicle control module 31, a lithium-ion battery controller 32, an engine control module 33, and a 4WD control module 34. These control devices 31, 32, 33, 34 are connected by means of a CAN communication line 35 (here, CAN is an acronym for "Controller Area Network") that is capable of bidirectional information exchange.

The vehicle control module 31 (acronym: "VCM") is an integrated control means that suitably manages the energy consumption of the entire vehicle. For example, the accelerator opening degree, vehicle speed, and the like, are input to this module. Then, when the accelerator opening degree exceeds a prescribed opening degree, the vehicle control module outputs a command to the inverter 14 to carry out power control of the motor 2 in accordance with the accelerator opening degree. When the accelerator opening degree is less than or equal to the prescribed opening degree, the vehicle control module outputs a command to the inverter 14 to carry out regenerative control of the motor 2 in accordance with the accelerator opening degree. In addition, when a charge request from the lithium-ion battery controller 32 is input, the vehicle control module starts the transverse engine 1 with the generator 3 and outputs a control command to the inverter 14 to shift to power generation. When a charge-stop request from the lithium-ion battery controller 32 is input, the vehicle control module outputs a control command to the inverter 14 to stop the power generation by the generator 3.

The lithium-ion battery controller 32 (acronym: "LBC") manages the battery temperature and the battery SOC of the lithium-ion battery 17, and the like. For example, when the battery SOC drops below a threshold value, the lithium-ion battery controller outputs a charge request to the vehicle control module 31 and the engine control module 33. When the battery SOC becomes greater than or equal to the threshold value, the lithium-ion battery controller outputs a charge-stop request to the vehicle control module 31 and the engine control module 33.

The engine control module 33 (acronym: "ECM") controls the engine start/engine stop, etc., by means of a control command to the transverse engine 1. For example, when a charge request from the lithium-ion battery controller 32 is input, the engine control module outputs an engine start command to the transverse engine 1 during cranking by the generator 3. When a charge-stop request from the lithium-ion battery controller 32 is input, the engine control module outputs an engine-stop command to the transverse engine 1.

The 4WD control module 34 (acronym: "4WDCM") controls the power distribution ratio between the left and right front wheels 6L, 6R and the left and right rear wheels 10L, 10R by means of a control command to the electronically controlled coupling 8. For example, the 4WD control module 34 inputs signals from a 4WD mode switch, a wheel speed sensor, a steering angle sensor, a yaw rate sensor, a G sensor, a brake switch, etc. Then, after carrying out a prescribed calculation process, the 4WD control module outputs a transmission torque command value to an electromagnetic actuator of the electronically controlled coupling 8, or the like. For example, when auto (AUTO) is selected by means of the 4WD mode switch, the 4WD control module calculates a torque command value by means of an initial torque process, a torque command value by means of a differential rotation torque process, and a torque command value by means of a driving force distribution torque process. The 4WD control module then selects the final transmission torque command value by finding the highest of the calculated torque command values, and controls the driving force distribution ratio. When the multi-plate friction clutch 8a of the electronically controlled coupling 8 is disengaged, the front and rear wheel driving force distribution ratios are controlled to be in 2WD mode by means of a front-wheel drive distribution, with a front-wheel distribution ratio of 100%:rear-wheel distribution ratio of 0%. When the multi-plate friction clutch 8a of the electronically controlled coupling 8 is completely engaged, full 4WD mode is achieved through an equal front and rear wheel drive distribution, with a front wheel distribution ratio of 50%:rear wheel distribution ratio of 50%. That is, front and rear wheel driving force distribution ratios of (front wheel distribution ratio of 100% to 50%):(rear wheel distribution ratio of 0% to 50%) can be achieved in a stepless manner by controlling the clutch engagement capacity of the multi-plate friction clutch 8a.

Layout Configuration of the Front-Side Power Transmission System

Figure 2:
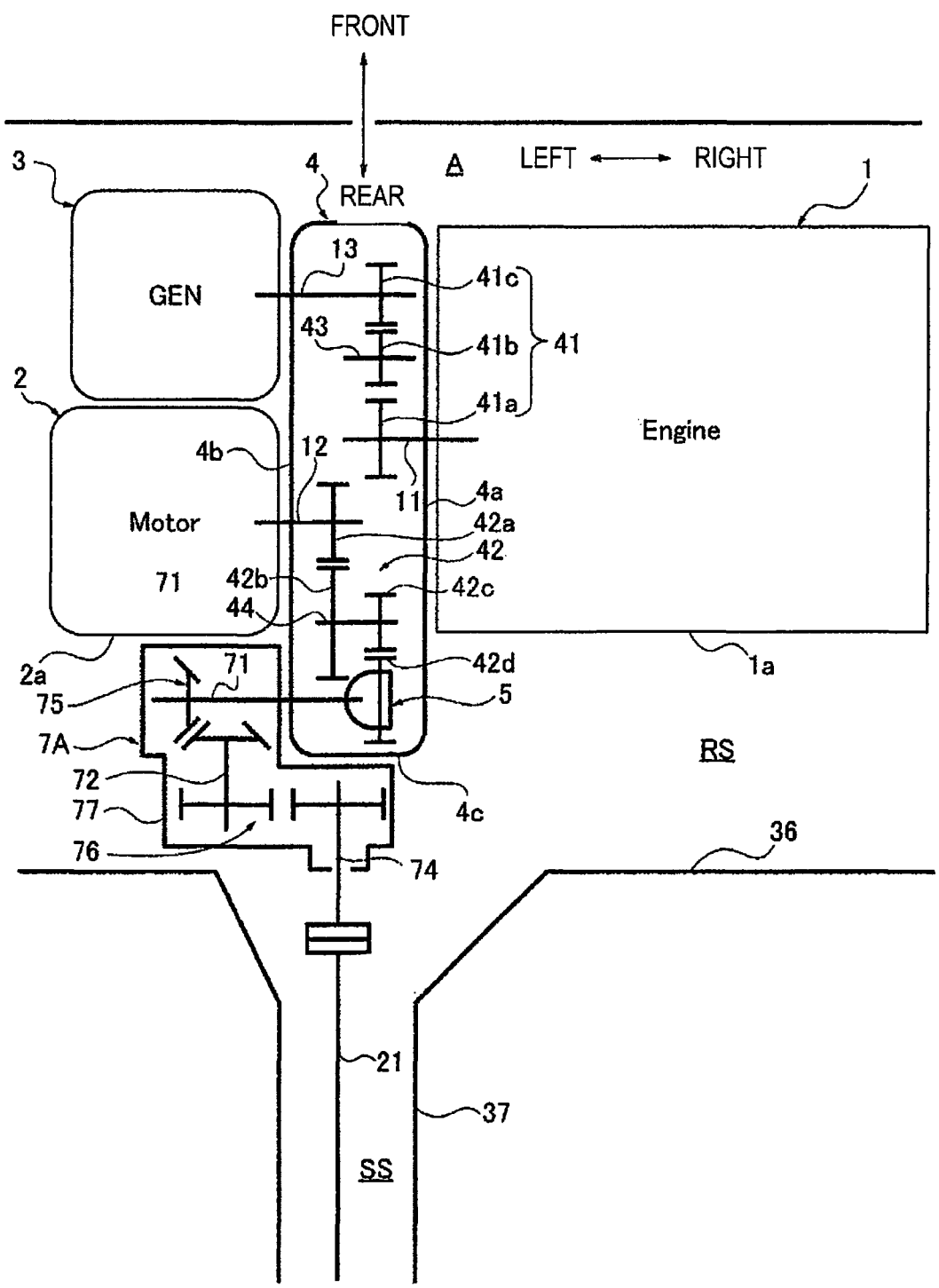
FIG. 2 is a skeleton diagram that shows a layout configuration of a front-side power transmission system of the first embodiment.

FIG. 2 shows a layout configuration of a front-side power transmission system in the first embodiment. The layout configuration of the front-side power transmission system will be described below with reference to FIG. 2.

As shown in FIG. 2, the front-side power transmission system includes the transverse engine 1, the motor 2, the generator 3, the gear case 4, the front differential 5, and the transfer case 7A, which are arranged in a front power unit room A.

The transverse engine 1 is supported on the right side surface 4a of the two side surfaces 4a, 4b of the gear case 4 in the right-side space region of the front power unit room A and is arranged horizontally such that the engine crankshaft 11 is oriented along the vehicle width direction.

The motor 2 is supported on the left side surface 4b of the two side surfaces 4a, 4b of the gear case 4 in the left-side space region of the front power unit room A and is arranged horizontally such that the motor shaft 12 is oriented along the vehicle width direction. The motor 2 is smaller than the transverse engine 1 in the vehicle width direction (the dimension of engine in the vehicle width direction>the dimension of motor in the vehicle width direction).

The generator 3 is supported on the left side surface 4b of the two side surfaces 4a, 4b of the gear case 4 in the left-side space region of the front power unit room A in a position adjacent to and in front of and below the motor 2 with respect to the vehicle and is arranged horizontally such that the generator shaft 13 is oriented in the vehicle width direction. The generator 3 is smaller than the motor dimension of the motor 2 in the vehicle width direction (the motor dimension in the vehicle width direction>the dimension of generator in the vehicle width direction).

The gear case 4 is arranged in a central space region of the front power unit room A, interposed between the transverse engine 1 on the side surfaces 4a, and the motor 2 and generator 3 on the side surface 4b. As shown in FIG. 2, the gear case 4, in a plan view, has the form of a rectangle with the short side in the width direction of the vehicle and the long side in the longitudinal direction of the vehicle. The vehicle rearward portion of the gear case 4, which includes the front differential 5, projects farther toward the rear of the vehicle than the vehicle rearward end surfaces 1a, 2a of the transverse engine 1 and the motor 2, respectively. The portions of the gear case 4 that project toward the rearward side of the vehicle, i.e., the right side surface 4a, and the left side surface 4b and a rear surface 4c (vehicle rearward side surface) on which the transfer case 7A is disposed, form an exposed portion.

In a top view, the transfer case 7A is supported by the gear case 4 so as to wrap around the left side surface 4b of the two side surfaces 4a, 4b of the gear case on which the motor 2 and the generator 3 are supported, from the left side surface 4b to the rear surface 4c of the exposed portion of the gear case 4. The transfer output shaft 74 then outputs power from the rear surface 4c of the gear case 4 to the left and right rear wheels 10L, 10R via the first propeller shaft 21 in the longitudinal direction of the vehicle.

In this manner, since the transfer case 7A is supported by the gear case 4 and wraps around from the left side surface 4b to the rear surface 4c in the layout configuration of the front-side power transmission system as seen from above, the following spaces are provided.

(A) A right-side space RS, surrounded by a vehicle-rear end surface 1a of the transverse engine 1, a dash panel 36, and a right-side vehicle body panel, not shown, is provided.

(B) A shaft space SS, in which the first propeller shaft 21 is disposed, is provided in a floor tunnel 37 extending in the longitudinal direction of the vehicle at essentially the central area in the vehicle width direction.

Detailed Configuration of the Gear Case

Figure 3:
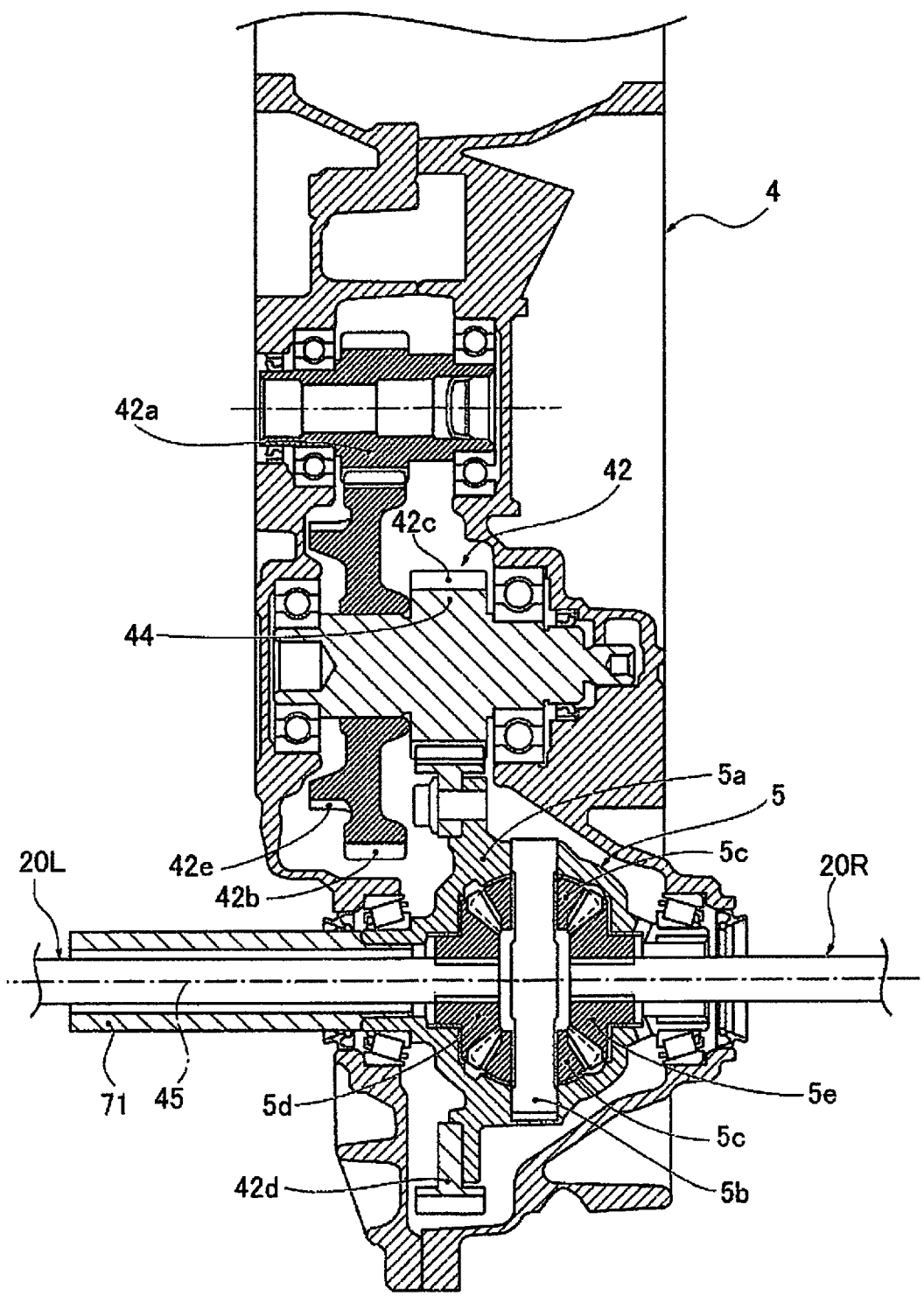
FIG. 3 is a cross-sectional view of a gear case that shows a configuration of a front differential and a reduction gear mechanism incorporated in a gear case in the power transmission device according to the first embodiment.

FIG. 3 shows a configuration of the front differential 5 and a reduction gear mechanism 42 incorporated in the gear case 4. The detailed configuration of the gear case 4 will be described below with reference to FIGS. 2 and 3.

As shown in FIGS. 2 and 3, the gear case 4 has a speed-increasing gear mechanism 41, the reduction gear mechanism 42, and the front differential 5.

The speed-increasing gear mechanism 41 is a gear train that connects the transverse engine 1 and the generator 3, and is configured by an intermeshing engine gear 41a, idler gear 41b, and generator gear 41c, as shown in FIG. 2.

The engine gear 41a is provided at an end position of the engine crankshaft 11. The idler gear 41b is provided on an idler shaft 43, which is supported at both ends so as to be rotatable with respect to the gear case 4. The generator gear 41c is provided at an end position of the generator shaft 13. The three shafts, the engine crankshaft 11, the idler shaft 43, and the generator shaft 13, are arranged parallel to each other.

Figure 4:
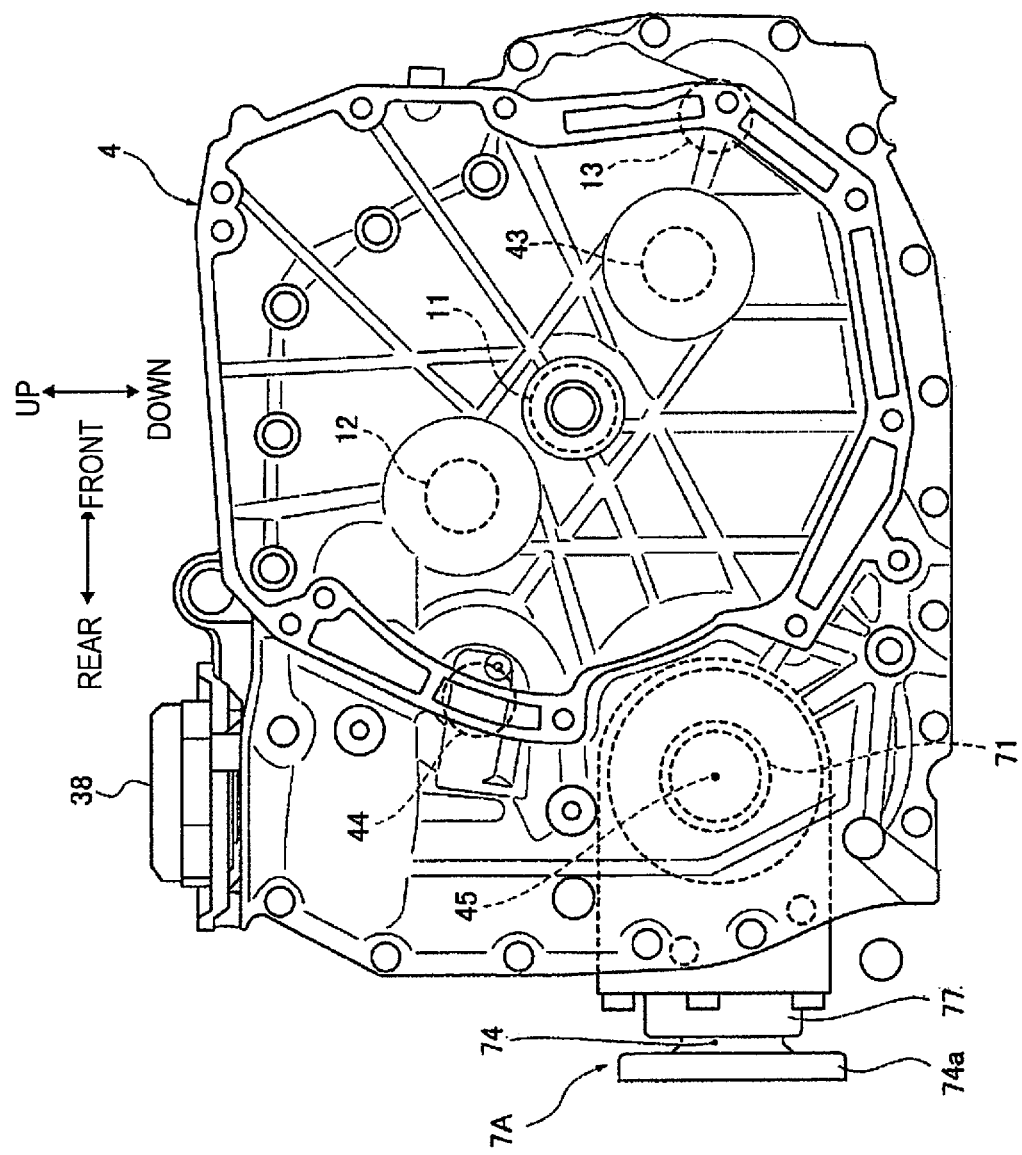
FIG. 4 is a side view of a transfer case and the gear case that shows the transfer case supported by the gear case in the power transmission device according to the first embodiment.

Here, in FIG. 2, which is an unfolded plan view, the three shafts, the engine crankshaft 11, the idler shaft 43, and the generator shaft 13, are shown located at the same height. However, as shown in FIG. 4, the engine crankshaft 11 is arranged at a central portion of the gear case 4. As shown in FIG. 4, the idler shaft 43 and the generator shaft 13 are disposed at lower side positions that are more forward in the vehicle than the engine crankshaft 11.

The relationship between the gear diameters of the speed-increasing gear mechanism 41 is such that the engine gear diameter>generator gear diameter, and when electric power is generated by the generator 3 by means of the operation of the transverse engine 1, a speed-increasing gear ratio is set. On the other hand, when the transverse engine 1 is started by the generator 3, a reduction gear ratio is set.

The reduction gear mechanism 42 is a gear train that connects the motor 2 and the front differential 5 and is configured by an intermeshing motor gear 42a and first idler gear 42b, and an intermeshing second idler gear 42c and ring gear 42d, as shown in FIGS. 2 and 3.

The motor gear 42a is provided at an end position of the motor shaft 12, which is supported at both ends so as to be rotatable with respect to the gear case 4. The first idler gear 42b and the second idler gear 42c are provided adjacent to an idler shaft 43, which is supported at both ends so as to be rotatable with respect to the gear case 4. The ring gear 42d is connected at an outer circumferential position of the differential case 5a of the front differential 5. The three axes, the axis of the motor shaft 12, the axis of the idler shaft 43, and the axis of rotation 45 of the front differential 5, are arranged parallel to each other. As shown in FIG. 3, a parking gear 42e is formed integrally on a side portion of the first idler gear 42b, so that a parking pawl engages when the parking range position is selected.

The relationship between the gear diameters of the reduction gear mechanism 42 is such that the motor gear diameter<the ring gear diameter, and when the motor 2 is driven to rotate, the reduction gear ratio is set. On the other hand, during regenerative power generation by the motor 2, the speed-increasing gear ratio is set.

Here, in FIG. 3, a planar view is illustrated in which the three axes of the motor shaft 12, the axis of the idler shaft 43, and the axis of rotation 45 of the front differential 5, are shown as being located at the same height. However, as shown in FIG. 4, the motor shaft 12 and the idler shaft 43 are disposed more toward the rear of the vehicle than the engine crankshaft 11, in an upper area of the gear case 4. As shown in FIG. 4, the axis of rotation 45 of the front differential 5 is disposed lower and more toward the rear of the vehicle than the idler shaft 43, in a lower position of the gear case 4.

As shown in FIG. 3, the front differential 5 includes the differential case 5a, a pinion shaft 5b, a pinion gear 5c, the left-side gear 5d, and the right-side gear 5e. A ring gear 42d that meshes with the second idler gear 42c, provided on the idler shaft 43, is fixed to an outer circumferential position of the differential case 5a. The pinion gear 5c is rotatably supported by the pinion shaft 5b, which is supported by the differential case 5a. The left-side gear 5d and the right-side gear 5e engage with the pinion gear 9c from the left and right sides, respectively. A left front drive shaft 20L is connected to the left-side gear 5d, and a right front drive shaft 20R is connected to the right-side gear 5e.

As shown in FIG. 3, the transfer input shaft 71 of the transfer case 7A is integrally provided at a left-side end position of the differential case 5a of the front differential 5 by means of spline connection, or the like. That is, the differential case 5a of the front differential 5 functions as a branch member for distributing power from the motor to the left and right front wheels 6L, 6R and the left and right rear wheels 10L, 10R.

Detailed Configuration of the Transfer Case

Figure 5:
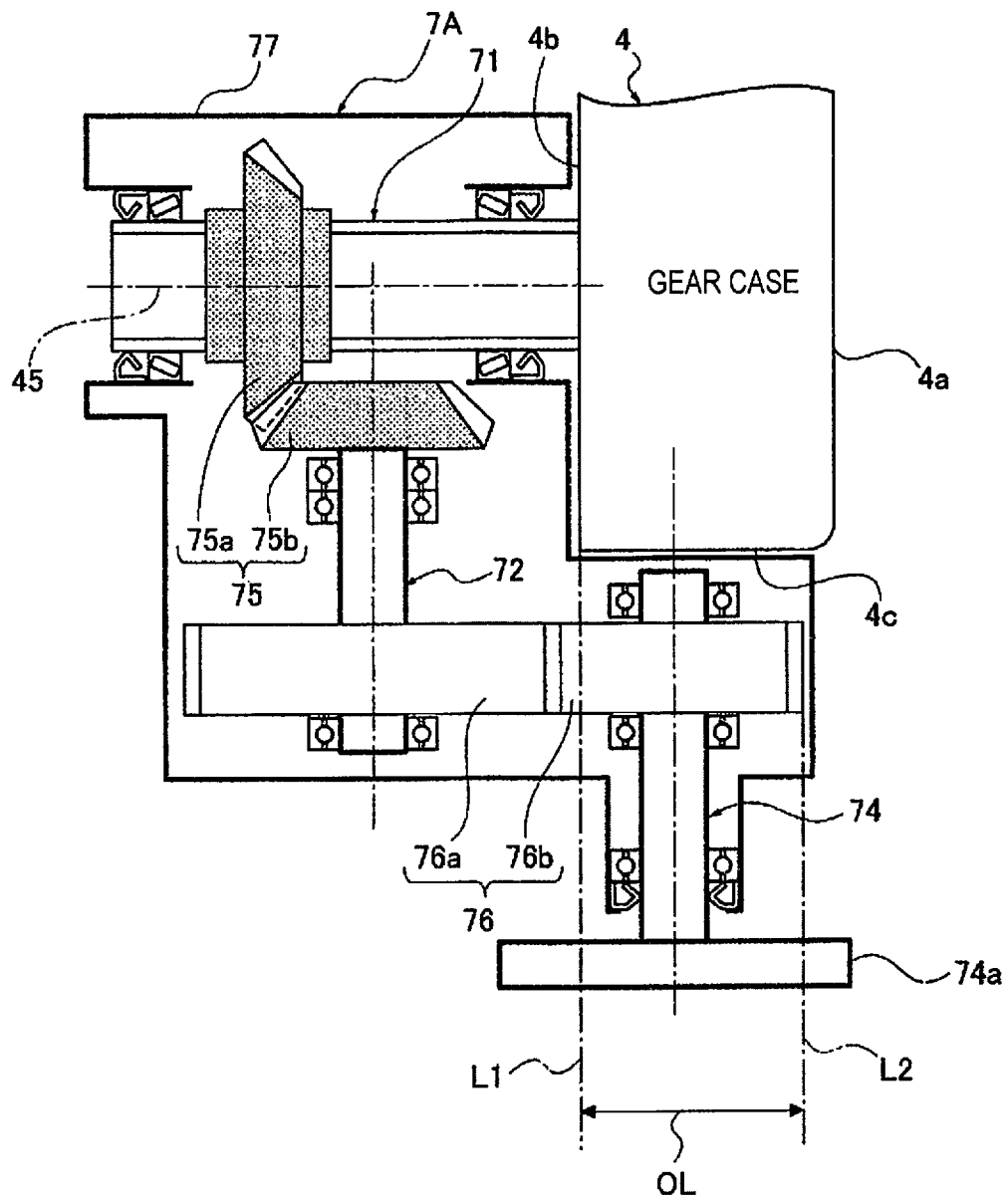
FIG. 5 is a cross-sectional view of the transfer case that shows a detailed configuration of the transfer case supported by the gear case in the power transmission device according to the first embodiment.

FIG. 4 shows the transfer case 7A supported by the gear case 4 in the power transmission device according to the first embodiment. FIG. 5 shows the detailed configuration of the transfer case 7A. The detailed configuration of the transfer case 7A will be described below with reference to FIGS. 2, 4, and 5.

As shown in FIG. 4, the transfer case 7A is supported at a rear surface position (the left-side position) on the vehicle-rearward lower side of the gear case 4 in a state in which the transfer output shaft 74 projects toward the rearward side of the vehicle when the gear case 4 is seen from the right side. As shown in FIG. 4, a parking actuator 38 is disposed at the uppermost position of the gear case 4.

As shown in FIGS. 2 and 5, the transfer case 7A includes the transfer input shaft 71, a transfer intermediate shaft 72, the transfer output shaft 74, a bevel gear pair 75, and a transfer gear pair 76 (a power transmission element) provided in a transfer casing 77.

Here, the bevel gear pair 75 and the transfer gear pair 76 are configured as a power transmission mechanism that transmits power by changing the direction of the axis of rotation of to an essentially orthogonal direction between the transfer input shaft 71 and the transfer output shaft 74.

As shown in FIG. 3, the transfer input shaft 71 is a hollow shaft that is connected to the differential case 5a of the front differential 5 and that is disposed in a position above the axis of rotation 45 of the front differential 5. The transfer input shaft 71 is oil-sealed with respect to the transfer casing 77 and supported at both ends. A ring gear 75a that meshes with a pinion gear 75b is integrally provided at an outer circumferential position of the transfer input shaft 71.

As shown in FIG. 5, the transfer intermediate shaft 72 extends toward the rear of the vehicle and is oriented essentially orthogonal to the transfer input shaft 71, which is arranged in the vehicle width direction; the front end portion of the transfer intermediate shaft is disposed in a position near the transfer input shaft 71. The transfer intermediate shaft 72 is supported at both ends with respect to the transfer casing 77. The pinion gear 75b that meshes with the ring gear 75a is provided at a front end portion of the transfer intermediate shaft 72. An intermediate shaft gear 76a is integrally provided at a rear portion of the transfer intermediate shaft 72.

The transfer output shaft 74 is arranged parallel to the transfer intermediate shaft 72 arranged along the longitudinal direction of the vehicle. This transfer output shaft 74 is supported at both ends with respect to the transfer casing 77. An output shaft gear 76b that meshes with the intermediate shaft gear 76a is provided at the front portion of the transfer output shaft 74. A flange portion 74a, to which the first rear propeller shaft 21 is connected, is integrally provided at the rear end portion of the transfer output shaft 74. As seen from the side, the transfer output shaft 74 is disposed with a downward angle of inclination that gradually decreases toward the rear of the vehicle, as shown in FIG. 4.

The bevel gear pair 75 is a power transmission element that connects the transfer input shaft 71 and the transfer intermediate shaft 72, which are arranged orthogonally to each other, so as to be capable of transmitting power by means of gear engagement. The bevel gear pair 75 is comprised of the ring gear 75a, which has a high void gear structure, and the pinion gear 75b, which orthogonally intermesh. The ring gear 75a of the bevel gear pair 75 is provided on the transfer input shaft 71. The position at which the ring gear 75a is set on the transfer input shaft 71 is configured to be adjustable over the vehicle width direction axis along the transfer input shaft 71.

The transfer gear pair 76 is a power transmission element that connects the transfer intermediate shaft 72 and the transfer output shaft 74, which are arranged parallel to each other, so as to be capable of transmitting power by means of gear engagement. The transfer gear pair 76 is comprised of the intermediate shaft gear 76a of the transfer intermediate shaft 72 and the output shaft gear 76b of the transfer output shaft 74, which intermesh.

The output shaft gear 76b (a rotatable member provided on the transfer output shaft) of the transfer gear pair 76 is disposed in a position overlapping the gear case 4 in the vehicle width direction.

Here, as shown in FIG. 5, the line produced by extending the left side surface 4b of the gear case 4 in the longitudinal direction of the vehicle is defined as extension line L1, and the line produced by extending the engine-side outer peripheral end of the output shaft gear 76b in the longitudinal direction of the vehicle is defined as extension line L2. The output shaft gear 76b provides a margin of overlap OL that overlaps the gear case 4 between the extension line L1 and the extension line L2 in the vehicle width direction.

With respect to the margin of overlap OL, the position at which the ring gear 75a is set on the transfer input shaft 71 is configured to be adjustable over the vehicle width direction axis along the transfer input shaft 71. Moreover, the transfer intermediate shaft 72 and the transfer output shaft 74 are coupled so as to be capable of transmitting power by means of gear engagement. Therefore, it is possible to adjust the size of the margin of overlap OL by moving the ring gear 75a within an allowable range of margin and/or changing the gear diameters of the intermediate shaft gear 76a and the output shaft gear 76b.

Figure 6:
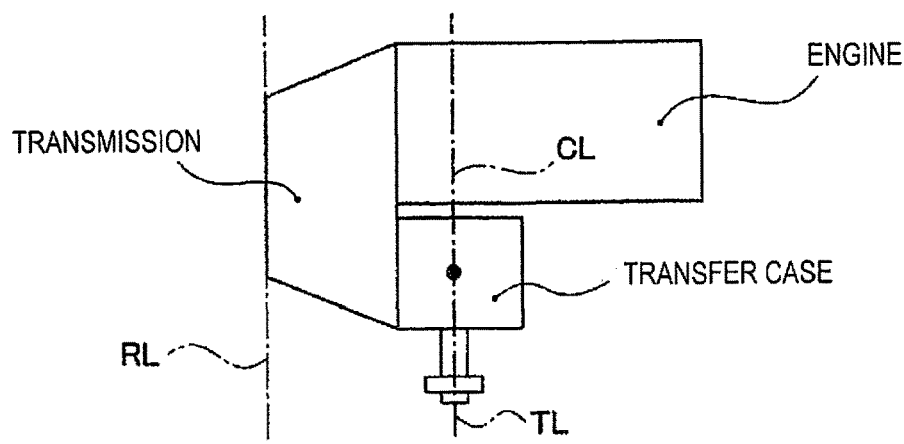
FIG. 6 is a layout configuration diagram that shows a vehicle mounting layout of an engine, a transmission, and a transfer case in a conventional four-wheel drive engine-powered vehicle.
Figure 7:
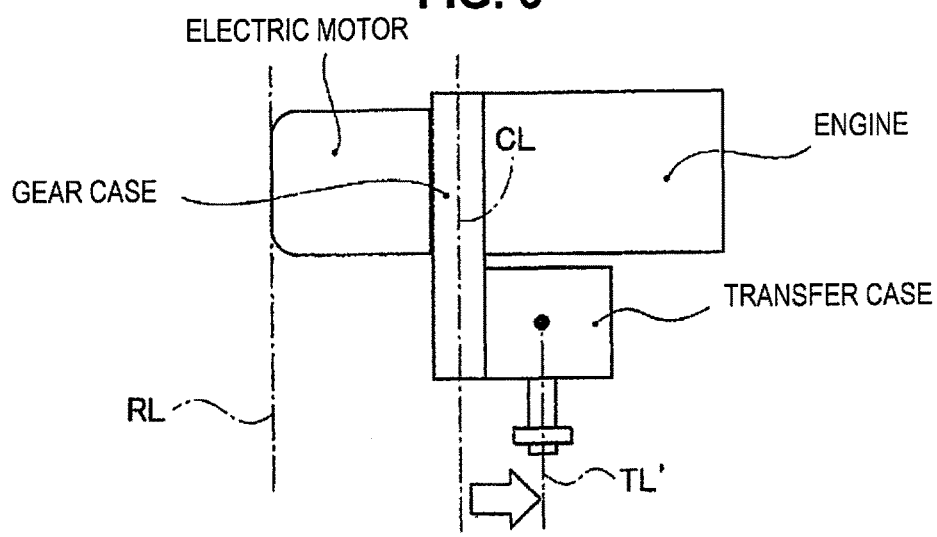
FIG. 7 is a layout configuration diagram that shows a vehicle mounting layout of an engine, an electric motor, a gear case, and a transfer case in a four-wheel drive hybrid vehicle in a comparative example.
Figure 8:
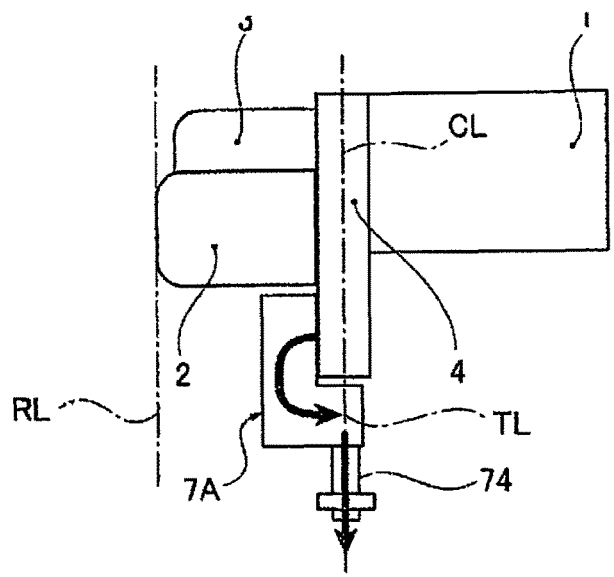
FIG. 8 is a layout configuration diagram that shows a vehicle mounting layout of a transverse engine, a motor, a generator, a gear case, and a transfer case in a four-wheel drive electrically driven vehicle according to the first embodiment.

Next, the actions are described. FIG. 6 shows a vehicle mounting layout of an engine, a transmission, and a transfer in a conventional four-wheel drive engine-powered vehicle, and FIG. 7 shows a vehicle mounting layout of an engine, an electric motor, a gear case, and a transfer case in a four-wheel drive hybrid vehicle of a comparative example. FIG. 8 shows a vehicle mounting layout of the transverse engine 1, the motor 2, the generator 3, the gear case 4, and the transfer case 7A in the four-wheel drive electrically driven vehicle according to the first embodiment. The operation of arranging the floor tunnel of the rear propeller shaft will be described below with reference to FIGS. 6 to 8.

In the conventional example, the transfer case is located on the same side surface of the two side surfaces of the transmission housing that supports the engine, as shown in FIG. 6. With this layout arrangement, the location TL of the transfer output shaft of the transfer case is arranged essentially coinciding with the center location CL of the engine and the transmission case in the vehicle width direction. Therefore, it is possible to dispose the propeller shaft, which is connected to the transfer output shaft, in the floor tunnel.

However, with advancements in the electrification of vehicles in recent years, it is now conceivable to add an electric motor as an additional power source to the engine. Therefore, as shown in FIG. 7, an example in which the electric motor is located on the side surface of the two side surfaces of the gear case that is opposite to the side surface on which the engine is supported, and the transfer case is located on the same side surface on which the engine is supported, as in the conventional example, shall serve as a comparative example.

In the case of the comparative example, the location TL' of the transfer output shaft shifts from the center location CL of the engine, the gear case, and the electric motor in the vehicle width direction toward the engine side in the vehicle width direction, as indicated by the arrow in FIG. 7. The reason for this is that the layout arrangement of the power unit with respect to the front power unit room is such that the end surface position of the transmission in the conventional example is used as a reference location RL, and the location of the end surface of the electric motor is also made to coincide with the reference location RL in the comparative example. Therefore, in the case of the conventional example, the engine and the transmission are arranged along the vehicle width direction, and the center location CL in the vehicle width direction overlaps the engine. In contrast, in the case of the comparative example, with the engine, the gear case, and the electric motor arranged in the vehicle width direction, the combined dimensions of the gear case and the electric motor in the vehicle width direction now exceed the transmission dimension in the vehicle width direction, so that the center location CL in the vehicle width direction overlaps the gear case.

As a result, in the case of the comparative example, in which the transfer case has the same layout configuration as in the conventional example, the following problems occur.
(a') The location TL' of the transfer output shaft is shifted from the center location CL in the vehicle width direction, and the propeller shaft cannot be disposed in the floor tunnel.
(b') In the case of the power train with electric motor of the comparative example, it becomes necessary to make additional investments in the development of a dedicated platform for mounting the power train with electric motor.
(c') When the power train with electric motor of the comparative example is to be mounted in a conventional vehicle body structure, the development of a new structure, such as a dedicated engine or a dedicated gear case, is required.

In contrast, the first embodiment employs a configuration in which the transfer case 7A is supported on the left side surface 4b of the gear case 4 and the output shaft gear 76b provided at the end portion of the transfer output shaft 74 is disposed in a position overlapping the gear case 4 in the vehicle width direction, as shown in FIG. 8.

That is, in the case of the first embodiment, since the transverse engine 1, the gear case 4, and the motor 2 are arranged in the vehicle width direction and the combined dimensions of the gear case 4 and the motor 2 in the vehicle width direction exceed the transmission dimension in the vehicle width direction, center location CL in the vehicle width direction overlaps the gear case 4. However, by arranging the output shaft gear 76b provided at the end portion of the transfer output shaft 74 in a position overlapping the gear case 4 in the vehicle width direction, the location TL of the transfer output shaft 74 will overlap the gear case 4. That is, the transfer case 7A is configured to wrap around such that the transfer output shaft 74 overlaps the gear case 4. As a result, it becomes possible to make the center location CL and the location TL of the transfer output shaft 74 in the vehicle width direction coincide, in the same manner as in the conventional example, while employing a layout configuration in which the transverse engine 1, the gear case 4, and the motor 2 are arranged along the vehicle width direction, in the same manner as in the comparative example.

As a result, with a layout configuration in which the transfer output shaft 74 of the first embodiment overlaps the gear case 4 in the vehicle width direction, the following advantages can be obtained.
(a) By making the location TL of the transfer output shaft 74 and center location CL in the vehicle width direction coincide, the first rear propeller shaft 21 can be disposed in the floor tunnel 37 of the vehicle body structure of a conventional four-wheel drive engine-powered vehicle.
(b) In the case of the first embodiment, because it is possible to share the platform with the conventional four-wheel drive engine-powered vehicle, it is not necessary to make additional investments in the development of a dedicated platform for a power train with electric motor.
(c) In the case of the first embodiment, since mounting in the vehicle body structure of a conventional four-wheel drive engine-powered vehicle is possible, the development of a new structure, such as a dedicated engine or gear case, is not required.

Next, the effects are described. The following effects can be obtained with the power transmission device of the four-wheel drive electrically driven vehicle according to the first embodiment.

(1) Supported by the gear case 4, the transfer case 7A distributes power from a power source (the transverse engine 1, the motor 2) between the main drive wheels (the left and the right front wheels 6L, 6R) and auxiliary drive wheels (the left and right rear wheels 10L, 10R). In the power transmission device of a four-wheel drive vehicle (the four-wheel drive electrically driven vehicle), the power source includes a first power source (the transverse engine 1) that is supported on one side surface 4a of the two side surfaces 4a, 4b of the gear case 4, and a second power source (the motor 2) that is supported on the other side surface 4b and that is smaller than the first power source. The transfer case 7A is supported on the same side surface 4b of the two side surfaces 4a, 4b of the gear case 4 as the side surface 4b that supports the second power source (the motor 2). The transfer case 7A comprises the transfer input shaft 71 that is connected to a differential (the front differential 5) to the main drive wheels and that is arranged in the vehicle width direction, the transfer output shaft 74 to which the propeller shaft (the first rear propeller shaft 21) to the auxiliary drive wheels is connected and that is arranged in the longitudinal direction of the vehicle, and a power transmission mechanism (the bevel gear pair 75, the transfer gear pair 76) that transmits power by changing the direction of the axis of rotation to an essentially orthogonal between the transfer input shaft 71 and the transfer output shaft 74. A rotatable member (the output shaft gear 76b) of the power transmission mechanism, which is provided on the transfer output shaft 74, is disposed in the vehicle width direction in a position overlapping the gear case 4 (FIG. 2). Therefore, it is possible to locate the transfer output shaft 74 at essentially the center position in the vehicle width direction and to avoid the inability to locate the propeller shaft (the first rear propeller shaft 21) in the floor tunnel 37. In addition, the transfer case 7A is supported on the same side surface 4b of the two side surfaces 4a, 4b of the gear case 4 as the side surface 4b on which the second power source (the motor 2) is supported. As a result, it is possible to achieve a power unit layout arrangement of a four-wheel drive vehicle (the four-wheel drive electrically driven vehicle) in which a space for a steering configuration for a right-hand drive car is provided. That is, in the case of a right-hand drive car, the right-side space RS in FIG. 2, which is not subjected to spatial restrictions caused by the transfer case 7A, becomes the space in which right steering system components are disposed. Therefore, for example, it is also possible to dispose right steering system components of a steer-by-wire structure that has a reaction force motor, a clutch, and a steering actuator in the steering system.

(2) The first power source is an engine (the transverse engine 1) and the second power source is an electric motor (the motor 2) (FIG. 1). Therefore, in addition to effect (1), the present invention can be applied to a power unit layout arrangement of a four-wheel drive hybrid vehicle in which the engine (the transverse engine 1) and the electric motor (the motor 2) are mounted.

(3) The electric motor is the motor 2 and the generator 3. The gear case 4 has the speed-increasing gear mechanism 41 that connects the engine (the transverse engine 1) and the generator 3, and the reduction gear mechanism 42 that connects the motor 2 and a differential (the front differential 5) (FIG. 2). Therefore, in addition to effect (2), with respect to four-wheel drive hybrid vehicles, the present invention can be applied to a power unit layout arrangement of a four-wheel drive electrically driven vehicle powered by the motor 2, using the electrical power generated by the engine (the transverse engine 1).

(4) The transfer case 7A has the transfer input shaft 71 in the vehicle width direction, the transfer intermediate shaft 72 in the longitudinal direction of the vehicle, and the transfer output shaft 74 in the longitudinal direction of the vehicle. The power transmission mechanism has the ring gear 75a and the pinion gear 75b, which are respectively provided on the transfer input shaft 71 and the transfer intermediate shaft 72 and define the bevel gear pair 75 that transmits power between the orthogonally arranged two shafts 71, 72, and the power transmission element (the transfer gear pair 76) that is provided between the transfer intermediate shaft 72 and the transfer output shaft 74 and transmits power between the two shafts 72, 74 arranged in parallel to each other (FIG. 5). Therefore, in addition to effects (1) to (3), the transfer case 7A, which transmits power by wrapping around from the side surface of the gear case 4 (the left side surface 4b) to the rear surface 4c, can be configured as a compact unit with a small number of components, including three shafts 71, 72, 74, the bevel gear pair 75, and the power transmission element (the transfer gear pair 76).

(5) The intermediate shaft gear 76a is provided on the transfer intermediate shaft 72. The output shaft gear 76b is provided on the transfer output shaft 74. The power transmission element is the transfer gear pair 76 comprised of the intermediate shaft gear 76a and the output shaft gear 76b, which intermesh (FIG. 5). Therefore, in addition to the effect of (4), the transmission of power from the transfer input shaft 71 to the transfer output shaft 74 of the transfer case 7A can be achieved by means of gear transmission.

Second Embodiment

The second embodiment is an example in which the power transmission element of the transfer intermediate shaft and the transfer output shaft is set as a transfer belt instead of the transfer gear of the first embodiment.

The configuration is described first. The "overall system configuration," the "layout configuration of the front-side power transmission system," and the "detailed configuration of the gear case" are the same as in the first embodiment, so that the illustrations and descriptions thereof are omitted. The "detailed configuration of the transfer" of the second embodiment will be described below.

Detailed Configuration of the Transfer Case

Figure 9:
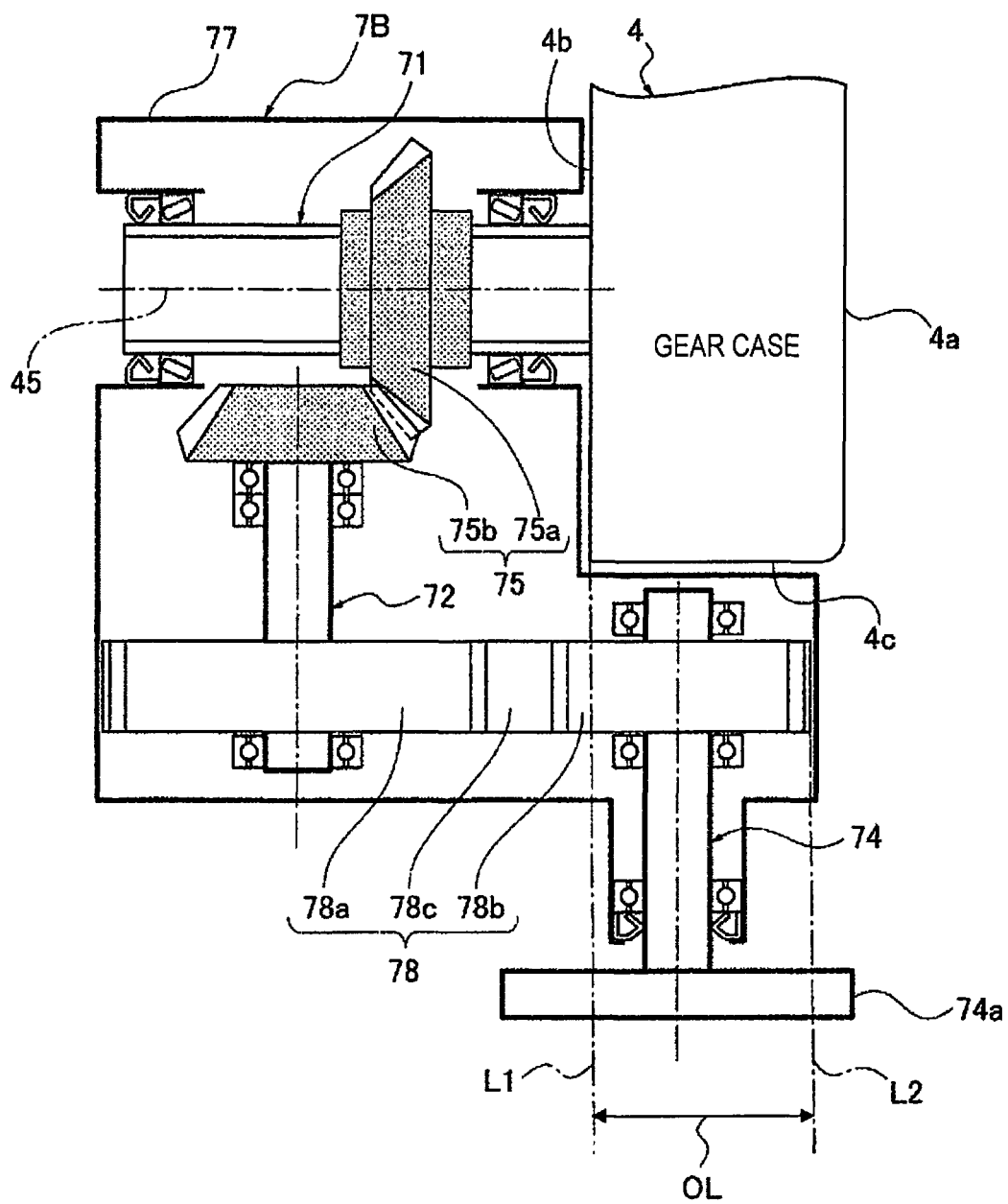
FIG. 9 is a cross-sectional view of the transfer case that shows a detailed configuration of the transfer case supported by the gear case in the power transmission device according to a second embodiment.

FIG. 9 shows a detailed configuration of a transfer case 7B supported by the gear case 4 in the power transmission device according to the second embodiment. The detailed configuration of the transfer case 7B will be described below with reference to FIG. 9.

As shown in FIG. 9, in the transfer case 7B, the transfer input shaft 71, a transfer intermediate shaft 72, the transfer output shaft 74, the bevel gear pair 75, and a transfer belt 78 (a power transmission element) are provided in the transfer casing 77.

Here, the bevel gear pair 75 and the transfer belt 78 are configured as a power transmission mechanism that transmits power by changing the direction of the axis of rotation to an essentially orthogonal direction between the transfer input shaft 71 and the transfer output shaft 74.

As shown in FIG. 9, the transfer input shaft 71 is a hollow shaft that is connected to the differential case 5a of the front differential 5 and that is disposed in a position above the axis of rotation 45 of the front differential 5. The transfer input shaft 71 is oil-sealed with respect to the transfer casing 77 and supported at both ends. The ring gear 75a that meshes with the pinion gear 75b is integrally provided at an outer circumferential position of the transfer input shaft 71. The gear setting orientation of the ring gear 75a is set to be the opposite of that of the first embodiment so as to match the direction of rotation.

As shown in FIG. 9, the transfer intermediate shaft 72 is oriented toward the rear of the vehicle, essentially orthogonal to the transfer input shaft 71, which is arranged in the vehicle width direction; the front end portion of the transfer intermediate shaft is disposed in a position next to the transfer input shaft 71. This transfer intermediate shaft 72 is supported at both ends with respect to the transfer casing 77. The pinion gear 75b that meshes with the ring gear 75a is provided at a front end portion of the transfer intermediate shaft 72. An intermediate shaft sprocket 78a is integrally provided at a rear portion of the transfer intermediate shaft 72.

The transfer output shaft 74 is arranged parallel to the transfer intermediate shaft 72 arranged in the longitudinal direction of the vehicle. This transfer output shaft 74 is supported at both ends with respect to the transfer casing 77. An output shaft sprocket 78b is provided at a front portion of the transfer output shaft 74. The flange portion 74a, to which the first rear propeller shaft 21 is connected, is integrally provided at a rear end portion of the transfer output shaft 74. As seen from the side, the transfer output shaft 74 is disposed with a downward angle of inclination that gradually decreases toward the rear of the vehicle, as shown in FIG. 4.

The bevel gear pair 75 is a power transmission element that connects the transfer input shaft 71 and the transfer intermediate shaft 72, which are arranged orthogonally to each other, so as to be capable of transmitting power by means of gear engagement. This bevel gear pair 75 is comprised of the pinion gear 75b and the ring gear 75a with a high void gear structure, which orthogonally intermesh. The ring gear 75a of the bevel gear pair 75 is provided on the transfer input shaft 71. The position at which the ring gear 75a is set on the transfer input shaft 71 is configured to be adjustable over the vehicle width direction axis along the transfer input shaft 71.

The transfer belt 78 is a power transmission element that connects the transfer intermediate shaft 72 and the transfer output shaft 74, which are arranged parallel to each other, so as to be capable of transmitting power by means of a meshing belt 78c. This transfer belt 78 is comprised of the intermediate shaft sprocket 78a of the transfer intermediate shaft 72, the output shaft sprocket 78b of the transfer output shaft 74, and the meshing belt 78c that spans the two sprockets 78a, 78b.

The output shaft sprocket 78b (a rotatable member provided on the transfer output shaft) of the transfer belt 78 is disposed in a position overlapping the gear case 4 in the vehicle width direction.

Here, as shown in FIG. 9, the line produced by extending the left side surface 4b of the gear case 4 in the longitudinal direction of the vehicle is defined as extension line L1, and the line produced by extending the engine-side outer peripheral end of the output shaft sprocket 78b in the longitudinal direction of the vehicle is defined as extension line L2. The output shaft sprocket 78b provides a margin of overlap OL that overlaps the gear case 4 between the extension line L1 and the extension line L2 in the vehicle width direction.

With respect to the margin of overlap OL, the position at which the ring gear 75a is set on the transfer input shaft 71 is configured to be adjustable over the vehicle width direction axis along the transfer input shaft 71. Moreover, the transfer intermediate shaft 72 and the transfer output shaft 74 are coupled so as to be capable of transmitting power by means of the meshing belt 78c. Therefore, it is possible to adjust the size of the margin of overlap OL by moving the ring gear 75a within an allowable range of margin and/or changing the distance between the shafts of the transfer intermediate shaft 72 and the transfer output shaft 74.

Here, the operation of arranging the floor tunnel for the rear propeller shaft is the same as in the first embodiment, so that the illustrations and descriptions thereof are omitted.

Next, the effects are described. The following effects can be obtained with the power transmission device of the four-wheel drive electrically driven vehicle according to the second embodiment.

(6) The intermediate shaft sprocket 78a is provided on the transfer intermediate shaft 72. The output shaft sprocket 78b is provided on the transfer output shaft 74. The power transmission element is set to be the transfer belt 78 comprised of the meshing belt 78c that spans the intermediate shaft sprocket 78a and the output shaft sprocket 78b (FIG. 9). Therefore, in addition to effect (4), the transmission of power from the transfer input shaft 71 to the transfer output shaft 74 of the transfer case 7B can be achieved by means of a combination of gear transmission and belt transmission.

Third Embodiment

The third embodiment is an example in which a transfer parallel shaft is used instead of the transfer intermediate shaft of the first and second embodiments, and the power transmission element is a transfer gear pair.

The configuration is described first. The "overall system configuration," the "layout configuration of the front-side power transmission system," and the "detailed configuration of the gear case" are the same as in the first embodiment, so that the illustrations and descriptions thereof are omitted. The "detailed configuration of the transfer" of the third embodiment will be described below.

Detailed Configuration of the Transfer Case

Figure 10:
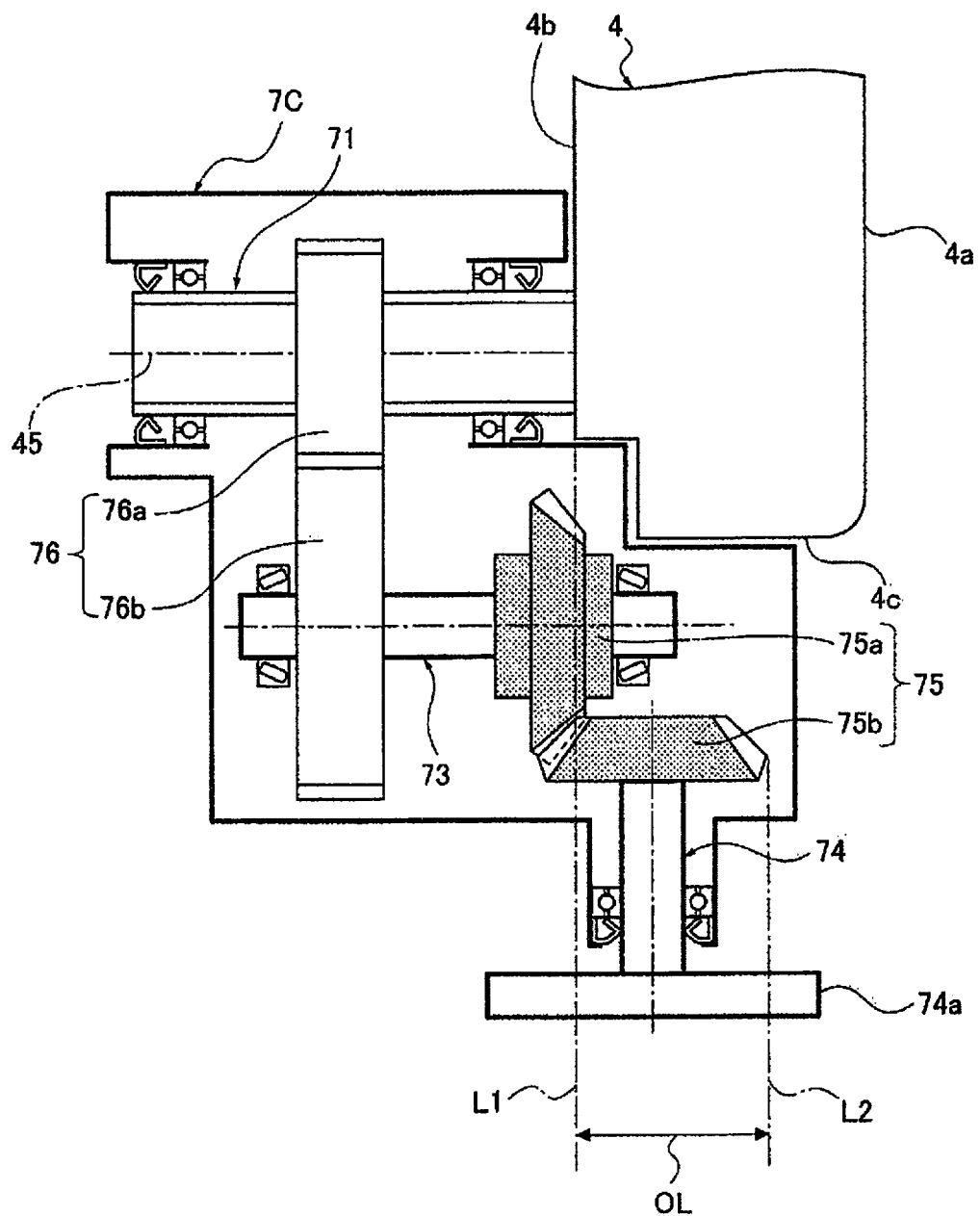
FIG. 10 is a cross-sectional view of the transfer case that shows a detailed configuration of the transfer case supported by the gear case in the power transmission device according to a third embodiment.

FIG. 10 shows a detailed configuration of a transfer case 7C supported by the gear case 4 in the power transmission device according to the third embodiment. The detailed configuration of the transfer case 7C will be described below with reference to FIG. 10.

As shown in FIG. 10, the transfer case 7C includes the transfer input shaft 71, a transfer parallel shaft 73, the transfer output shaft 74, the bevel gear pair 75, and the transfer gear pair 76 (the power transmission element) provided in the transfer casing 77.

Here, the bevel gear pair 75 and the transfer gear pair 76 are configured as a power transmission mechanism that transmits power by changing the direction of the axis of rotation to an essentially orthogonal direction between the transfer input shaft 71 and the transfer output shaft 74.

As shown in FIG. 10, the transfer input shaft 71 is a hollow shaft that is connected to the differential case 5a of the front differential 5 and that is disposed in a position above the axis of rotation 45 of the front differential 5. The transfer input shaft 71 is oil-sealed with respect to the transfer casing 77 and supported at both ends. An input shaft gear 76a that meshes with a parallel shaft gear 76b is integrally provided at an outer circumferential position of the transfer input shaft 71.

The transfer parallel shaft 73 is arranged parallel to the transfer input shaft 71 arranged in the vehicle width direction, as shown in FIG. 10. The transfer parallel shaft 73 is supported at both ends with respect to the transfer casing 77. The parallel shaft gear 76b that meshes with the input shaft gear 76a is provided at a motor-side end portion of the transfer parallel shaft 73. The ring gear 75a that meshes with the pinion gear 75b is provided at an engine-side end portion of the transfer parallel shaft 73.

The transfer output shaft 74 is arranged in the longitudinal direction of the vehicle and is orthogonal to the transfer input shaft 71 and the transfer parallel shaft 73, which are arranged in the vehicle width direction. The transfer output shaft 74 is supported at both ends with respect to the transfer casing 77. The pinion gear 75b that meshes with the ring gear 75a is provided at a front portion of the transfer output shaft 74. The flange portion 74a, to which the first rear propeller shaft 21 is connected, is integrally provided at a rear end portion of the transfer output shaft 74. As seen from the side, the transfer output shaft 74 is disposed with a downward angle of inclination that gradually decreases toward the rear side of the vehicle, as shown in FIG. 4.

The bevel gear pair 75 is a power transmission element that connects the transfer parallel shaft 73 and the transfer output shaft 74, which are arranged orthogonally to each other, so as to be capable of transmitting power by means of gear engagement. The bevel gear pair 75 is comprised of the pinion gear 75b and the ring gear 75a that has a high void gear structure, which intermesh orthogonally. The ring gear 75a of the bevel gear pair 75 is provided on the transfer parallel shaft 73. The position at which the ring gear 75a is set on the transfer parallel shaft 73 is configured to be adjustable over the vehicle width direction axis along the transfer parallel shaft 73.

The transfer gear pair 76 is a power transmission element that connects the transfer input shaft 71 and the transfer parallel shaft 73, which are arranged parallel to each other, so as to be capable of transmitting power by means of gear engagement. The transfer gear pair 76 is comprised of the input shaft gear 76a of the transfer input shaft 71 and the parallel shaft gear 76b of the transfer parallel shaft 73, which intermesh.

The pinion gear 75b (a rotatable member provided on the transfer output shaft) of the bevel gear pair 75 is disposed in a position overlapping the gear case 4 in the vehicle width direction.

Here, as shown in FIG. 10, the line produced by extending the left side surface 4b of the gear case 4 in the longitudinal direction of the vehicle is defined as extension line L1, and the line produced by extending the engine-side outer peripheral end of the pinion gear 75b in the longitudinal direction of the vehicle is defined as extension line L2. The pinion gear 75b provides the margin of overlap OL that overlaps the gear case 4 between the extension line L1 and the extension line L2 in the vehicle width direction.

With respect to the margin of overlap OL, the position at which the ring gear 75a is set on the transfer parallel shaft 73 is configured to be adjustable over the vehicle width direction axis along the transfer parallel shaft 73. Therefore, it is possible to adjust the size of the margin of overlap OL by moving the ring gear 75a within an allowable range of margin.

Here, the operation of arranging the floor tunnel for the rear propeller shaft is the same as in the first embodiment, so that the illustrations and descriptions thereof are omitted.

Next, the effects are described. The following effects can be obtained with the power transmission device of the four-wheel drive electrically driven vehicle according to the third embodiment.

(7) The transfer case 7C has the transfer input shaft 71 in the vehicle width direction, the transfer parallel shaft 73 in the vehicle width direction, and the transfer output shaft 74 in the longitudinal direction of the vehicle. The power transmission mechanism has a power transmission element (the transfer gear pair 76) that is provided between the transfer input shaft 71 and the transfer parallel shaft 73 and that transmits power between the two shafts 71, 73 arranged in parallel to each other, and the ring gear 75a and the pinion gear 75b, which are respectively provided on the transfer parallel shaft 73 and the transfer output shaft 74 and define the bevel gear pair 75 that transmits power between the orthogonally arranged two shafts (FIG. 10). Therefore, in addition to effects (1) to (3), the transfer case 7C, which transmits power by wrapping around from the side surface of the gear case 4 (the left side surface 4b) to the rear surface 4c, can be configured as a compact unit with a small number of components, including three shafts 71, 73, 74, the bevel gear pair 75, and the power transmission element (the transfer gear pair 76).

(8) The input shaft gear 76a is provided on the transfer input shaft 71. The parallel shaft gear 76b is provided on the transfer parallel shaft 73. The power transmission element is the transfer gear pair 76 comprised of the input shaft gear 76a and the parallel shaft gear 76b, which intermesh (FIG. 10). Therefore, in addition to effect (7), the power transmission from the transfer input shaft 71 to the transfer output shaft 74 of the transfer case 7C can be achieved by means of gear transmission.

Fourth Embodiment

The fourth embodiment is an example in which a transfer parallel shaft is used instead of the transfer intermediate shaft of the first and second embodiments, and the power transmission element is a transfer belt.

The configuration is described first. The "overall system configuration," the "layout configuration of the front-side power transmission system," and the "detailed configuration of the gear case" are the same as in the first embodiment, so that the illustrations and descriptions thereof are omitted. The "detailed configuration of the transfer" of the fourth embodiment will be described below.

Detailed Configuration of the Transfer Case

Figure 11:
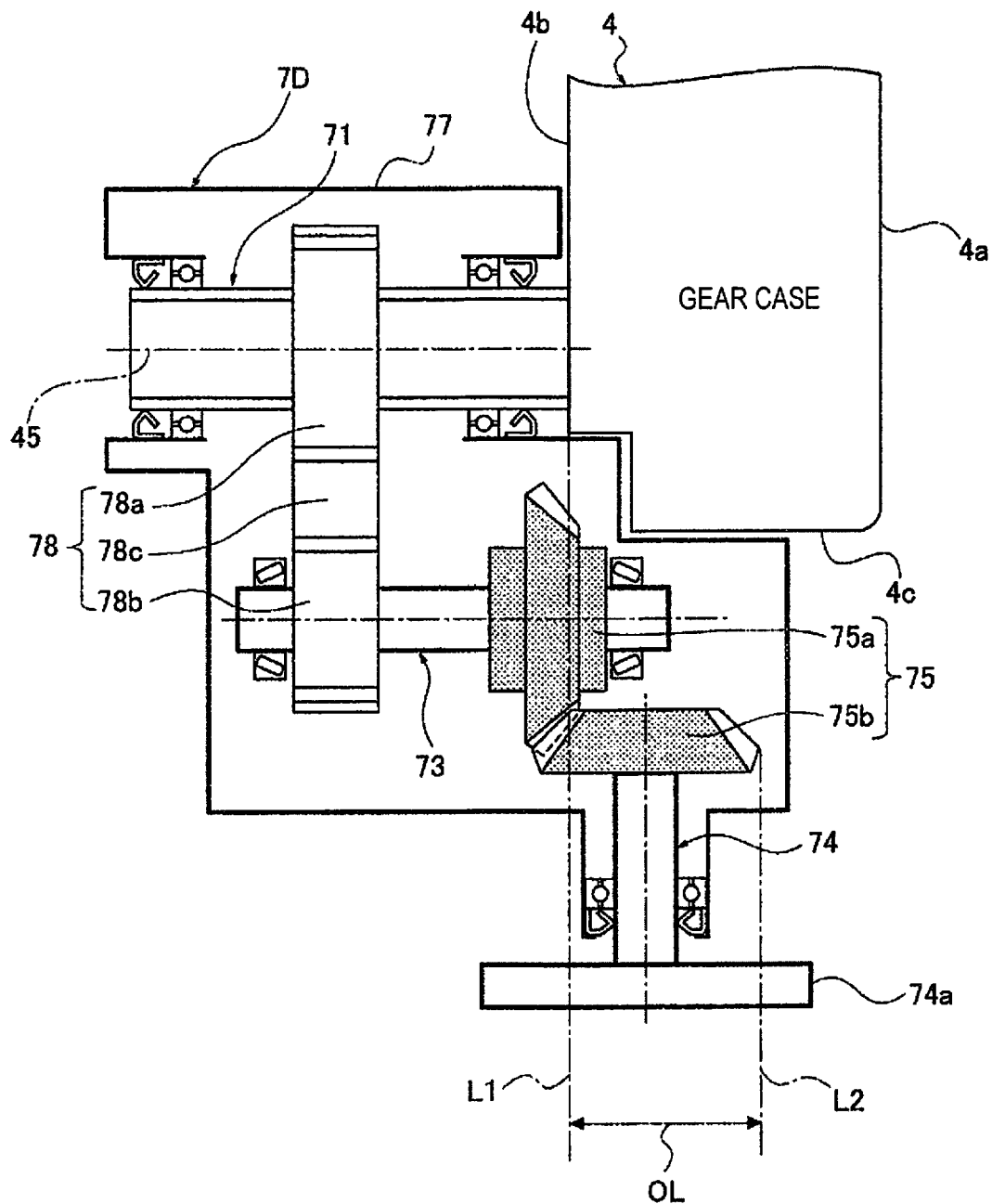
FIG. 11 is a cross-sectional view of the transfer case that shows a detailed configuration of the transfer case supported by the gear case in the power transmission device according to a fourth embodiment.

FIG. 11 shows a detailed configuration of a transfer case 7D supported by the gear case 4 in the power transmission device according to the fourth embodiment. The detailed configuration of the transfer case 7D will be described below with reference to FIG. 11.

As shown in FIG. 11, the transfer case 7D includes the transfer input shaft 71, the transfer parallel shaft 73, the transfer output shaft 74, the bevel gear pair 75, and the transfer belt 78 (a power transmission element) provided in the transfer casing 77.

Here, the bevel gear pair 75 and the transfer belt 78 are configured as a power transmission mechanism that transmits power by changing the direction of the axis of rotation to an essentially orthogonal direction between the transfer input shaft 71 and the transfer output shaft 74.

As shown in FIG. 11, the transfer input shaft 71 is a hollow shaft that is connected to the differential case 5a of the front differential 5 and that is disposed in a position above the axis of rotation 45 of the front differential 5. The transfer input shaft 71 is oil-sealed with respect to the transfer casing 77 and supported at both ends. An input shaft sprocket 78a is provided at an outer circumferential position of the transfer input shaft 71.

The transfer parallel shaft 73 is arranged parallel to the transfer input shaft 71 in the vehicle width direction, as shown in FIG. 11. The transfer parallel shaft 73 is supported at both ends with respect to the transfer casing 77. A parallel shaft sprocket 78b is provided on a motor-side end portion of the transfer parallel shaft 73. The ring gear 75a, which that meshes with the pinion gear 75b, is provided at the engine-side end portion of the transfer parallel shaft 73.

The transfer output shaft 74 is arranged in the longitudinal direction of the vehicle, which is orthogonal to the transfer input shaft 71 and the transfer parallel shaft 73, which are arranged in the vehicle width direction. The transfer output shaft 74 is supported at both ends with respect to the transfer casing 77. The pinion gear 75b, which meshes with the ring gear 75a, is provided at a front portion of the transfer output shaft 74. The flange portion 74a, to which the first rear propeller shaft 21 is connected, is integrally provided at a rear end portion of the transfer output shaft 74. As seen from the side, the transfer output shaft 74 is disposed with a downward angle of inclination that gradually decreases toward the rear side of the vehicle, as shown in FIG. 4.

The bevel gear pair 75 is a power transmission element that connects the transfer parallel shaft 73 and the transfer output shaft 74, which are arranged orthogonally to each other, so as to be capable of transmitting power by means of gear engagement. The bevel gear pair 75 is comprised of the pinion gear 75b and the ring gear 75a that has a high void gear structure, which orthogonally intermesh. The ring gear 75a of the bevel gear pair 75 is provided on the transfer parallel shaft 73. The position at which the ring gear 75a is set on the transfer parallel shaft 73 is configured to be adjustable over the vehicle width direction axis along the transfer parallel shaft 73.

The transfer belt 78 is a power transmission element that connects the transfer input shaft 71 and the transfer parallel shaft 73, which are arranged parallel to each other, so as to be capable of transmitting power by means of the meshing belt 78c. The transfer belt 78 is comprised of the input shaft sprocket 78a of the transfer input shaft 71, the parallel shaft sprocket 78b of the transfer parallel shaft 73, and the meshing belt 78c that spans the two sprockets 78a, 78b.

The pinion gear 75b (a rotatable member provided on the transfer output shaft) of the transfer gear pair 75 is disposed in a position overlapping the gear case 4 in the vehicle width direction.

Here, as shown in FIG. 11, the line produced by extending the left side surface 4b of the gear case 4 in the longitudinal direction of the vehicle is defined as extension line L1, and the line produced by extending the engine-side outer peripheral end of the pinion gear 75b in the longitudinal direction of the vehicle is defined as extension line L2. The pinion gear 75b provides a margin of overlap OL that overlaps the gear case 4 between the extension line L1 and the extension line L2 in the vehicle width direction.

With respect to the margin of overlap OL, the position at which the ring gear 75a is set on the transfer parallel shaft 73 is configured to be adjustable over the vehicle width direction axis along the transfer parallel shaft 73. Therefore, it is possible to adjust the size of the margin of overlap OL by moving the ring gear 75a within an allowable range of margin.

Here, the operation of arranging the floor tunnel of the rear propeller shaft is the same as the first embodiment, so that the illustrations and descriptions thereof are omitted.

Next, the effects are described. The following effects can be obtained with the power transmission device of the four-wheel drive electrically driven vehicle according to the fourth embodiment.

(9) The input shaft sprocket 78a is provided on the transfer input shaft 71. The parallel shaft sprocket 78b is provided on the transfer parallel shaft 73. The power transmission element is set to be the transfer belt 78 in which the meshing belt 78c spans the input shaft sprocket 78a and the parallel shaft sprocket 78b (FIG. 11). Therefore, in addition to effect (7), the transmission of power from the transfer input shaft 71 to the transfer output shaft 74 of the transfer case 7D can be achieved by means of a combined belt transmission and gear transmission.

The power transmission device of a four-wheel drive vehicle according to the present disclosure has been described above based on the first to the fourth embodiments. However, specific configurations are not limited to these embodiments and various modifications and additions to the design can be made without departing from the scope of the invention according to each claim in the Claims section.

In the first to the fourth embodiments, examples were shown in which the power source includes the transverse engine 1, which is supported in the vehicle width direction on one side surface 4a of the two side surfaces 4a, 4b of the gear case 4, and the motor 2, which is supported in the vehicle width direction on the other side surface 4b and which is smaller than the transverse engine 1. However, the power source may include a main motor, which is supported in the vehicle width direction on one side surface of the two side surfaces of the gear case, and an auxiliary motor, which is supported in the vehicle width direction on the other side surface and which is smaller than the main motor. Moreover, the power source may include a primary engine, which is supported along the vehicle width direction on one of two side surfaces of the gear case, and an auxiliary engine, which is supported along the vehicle width direction on the other side surface and which is smaller than the primary engine.

In the first to the fourth embodiments, examples were shown in which the gear case 4 has the speed-increasing gear mechanism 41 that connects the transverse engine 1 and the generator 3, and the reduction gear mechanism 42 that connects the motor 2 and the front differential 5. However, the gear case may be such that a clutch mechanism that can connect the engine and the front differential, or the like, is added to the speed-increasing gear mechanism and the reduction gear mechanism. Moreover, the gear case may include a stepped transmission gear mechanism, a stepless transmission gear mechanism, or a power split gear mechanism.

In the first to the fourth embodiments, examples were shown in which the power transmission device of the present disclosure is applied to an FF-based four-wheel drive electrically driven vehicle that has an engine as a power source for power generation and a motor as a power source for travel, and that uses the electric power generated by the engine to travel with the motor. However, the power transmission device of the present disclosure can also be applied to an FR-based four-wheel drive electrically driven vehicle. Moreover, the present disclosure can be applied not only to a four-wheel drive electrically driven vehicle, but also to a four-wheel drive engine-powered vehicle, a four-wheel drive electric vehicle, and a four-wheel drive hybrid vehicle.

The invention claimed is:

1. A power transmission device of a four-wheel drive vehicle, the power transmission device comprising:
 a transfer case that is supported by a gear case and that distributes power from a power source to main drive wheels and auxiliary drive wheels,
 the power source including an engine that is supported on one of two side surfaces of the gear case, and an electric motor that is supported on the other side surface, the electric motor being smaller than the engine,
 the transfer case is supported on the same side surface of the two side surfaces of the gear case as the side surface on which the electric motor is supported,
 the transfer case including
 a transfer input shaft that is connected to a differential to the main drive wheels and that is arranged in a vehicle width direction,
 a transfer output shaft that is connected to the auxiliary drive wheels by a propeller shaft and that is arranged in a longitudinal direction of the vehicle,
 a power transmission mechanism that transmits power by changing a direction of an axis of rotation to an essentially orthogonal direction between the transfer input shaft and the transfer output shaft,
 a rotatable member of the power transmission mechanism that is provided on the transfer output shaft and that is disposed in a position overlapping the gear case in the vehicle width direction, and
 the transfer case being supported by the gear case and wrapping around from the other side surface on which the electric motor is supported to a rear surface as seen from above in a layout configuration of a front-side power transmission system to provide a space that is surrounded by a vehicle-rear end surface of the engine, a dash panel, and a vehicle body side panel.

2. The power transmission device according to claim 1, wherein
 the electric motor includes a motor and a generator, and
 the gear case includes a speed-increasing gear mechanism that connects the engine and the generator, and a reduction gear mechanism that connects the motor and the differential.

3. The power transmission device according to claim 2, wherein
 the transfer case includes a transfer input shaft extending in the vehicle width direction, a transfer intermediate shaft extending in the longitudinal direction of the vehicle, and a transfer output shaft extending in the longitudinal direction of the vehicle, and
 the power transmission mechanism comprises
 a ring gear and a pinion gear, which are respectively provided on the transfer input shaft and the transfer intermediate shaft, and which define a bevel gear pair that transmits power between two orthogonally arranged shafts, and
 a power transmission element that is provided between the transfer intermediate shaft and the transfer output shaft and that transmits power between the two parallel shafts.

4. The power transmission device according to claim 3, wherein
 an intermediate shaft gear is provided on the transfer intermediate shaft,
 an output shaft gear is provided on the transfer output shaft, and
 the power transmission element is a transfer gear pair comprised of the intermediate shaft gear and the output shaft gear, which intermesh.

5. The power transmission device according to claim 3, wherein
 an intermediate shaft sprocket is provided on the transfer intermediate shaft,
 an output shaft sprocket is provided on the transfer output shaft, and
 the power transmission element is a transfer belt in which a meshing belt spans the intermediate shaft sprocket and the output shaft sprocket.

6. The power transmission device according to claim 2, wherein
the transfer includes a transfer input shaft extending in the vehicle width direction, a transfer parallel shaft extending in the vehicle width direction, and a transfer output shaft extending in the longitudinal direction of the vehicle, and
the power transmission mechanism comprises
a power transmission element that is provided between the transfer input shaft and the transfer parallel shaft and that transmits power between two parallel shafts, and
a ring gear and a pinion gear, which are respectively provided on the transfer parallel shaft and the transfer output shaft, and that define a bevel gear pair that transmits power between two orthogonally arranged shafts.

7. The power transmission device according to claim 6, wherein
an input shaft gear is provided on the transfer input shaft,
a parallel shaft gear is provided on the transfer parallel shaft, and
the power transmission element is a transfer gear pair comprised of the input shaft gear and the parallel shaft gear, which intermesh.

8. The power transmission device according to claim 6, wherein
an input shaft sprocket is provided on the transfer input shaft,
a parallel shaft sprocket is provided on the transfer parallel shaft, and
the power transmission element is a transfer belt in which a meshing belt spans the input shaft sprocket and the parallel shaft sprocket.

9. The power transmission device according to claim 1, wherein
the transfer case includes a transfer input shaft extending in the vehicle width direction, a transfer intermediate shaft extending in the longitudinal direction of the vehicle, and a transfer output shaft extending in the longitudinal direction of the vehicle, and
the power transmission mechanism comprises
a ring gear and a pinion gear, which are respectively provided on the transfer input shaft and the transfer intermediate shaft, and which define a bevel gear pair that transmits power between two orthogonally arranged shafts, and
a power transmission element that is provided between the transfer intermediate shaft and the transfer output shaft and that transmits power between the two parallel shafts.

10. The power transmission device according to claim 9, wherein
an intermediate shaft gear is provided on the transfer intermediate shaft,
an output shaft gear is provided on the transfer output shaft, and
the power transmission element is a transfer gear pair comprised of the intermediate shaft gear and the output shaft gear, which intermesh.

11. The power transmission device according to claim 9, wherein
an intermediate shaft sprocket is provided on the transfer intermediate shaft,
an output shaft sprocket is provided on the transfer output shaft, and
the power transmission element is a transfer belt in which a meshing belt spans the intermediate shaft sprocket and the output shaft sprocket.

12. The power transmission device according to claim 1, wherein
the transfer includes a transfer input shaft extending in the vehicle width direction, a transfer parallel shaft extending in the vehicle width direction, and a transfer output shaft extending in the longitudinal direction of the vehicle, and
the power transmission mechanism comprises
a power transmission element that is provided between the transfer input shaft and the transfer parallel shaft and that transmits power between two parallel shafts, and
a ring gear and a pinion gear, which are respectively provided on the transfer parallel shaft and the transfer output shaft, and that define a bevel gear pair that transmits power between two orthogonally arranged shafts.

13. The power transmission device according to claim 12, wherein
an input shaft gear is provided on the transfer input shaft,
a parallel shaft gear is provided on the transfer parallel shaft, and
the power transmission element is a transfer gear pair comprised of the input shaft gear and the parallel shaft gear, which intermesh.

14. The power transmission device according to claim 12, wherein
an input shaft sprocket is provided on the transfer input shaft,
a parallel shaft sprocket is provided on the transfer parallel shaft, and
the power transmission element is a transfer belt in which a meshing belt spans the input shaft sprocket and the parallel shaft sprocket.

* * * * *